United States Patent
Vasilescu

(10) Patent No.: US 6,844,638 B2
(45) Date of Patent: Jan. 18, 2005

(54) FAN FOR ROTATING ELECTRIC MACHINE

(75) Inventor: Claudiu Vasilescu, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 216 days.

(21) Appl. No.: 10/311,751

(22) PCT Filed: Apr. 26, 2002

(86) PCT No.: PCT/FR02/01446

§ 371 (c)(1),
(2), (4) Date: Dec. 19, 2002

(87) PCT Pub. No.: WO02/089299

PCT Pub. Date: Nov. 7, 2002

(65) Prior Publication Data

US 2003/0151316 A1 Aug. 14, 2003

(30) Foreign Application Priority Data

Apr. 27, 2001 (FR) .............................. 01 05772

(51) Int. Cl.⁷ ................................................ H02K 9/00
(52) U.S. Cl. .......................................... 310/62; 310/63
(58) Field of Search ........................ 310/52–59, 61–63, 310/89, 261

(56) References Cited

U.S. PATENT DOCUMENTS 5,144,175 A * 9/1992 Craggs ........................ 310/63
5,235,229 A * 8/1993 Tanaka et al. ................ 310/62
5,742,107 A * 4/1998 Asao et al. ................... 310/62
5,965,965 A * 10/1999 Umeda et al. ................ 310/52
6,023,112 A    2/2000 Asao
6,448,687 B2 * 9/2002 Higashino et al. .......... 310/263
6,509,660 B1 * 1/2003 Asao ............................. 310/63
6,586,853 B2 * 7/2003 Ishida et al. .................. 310/62

FOREIGN PATENT DOCUMENTS

| EP | 0 293 277 | 11/1988 |
|---|---|---|
| EP | 0 920 110 A2 | 6/1999 |
| JP | 63 015652 | 1/1988 |
| JP | 09 201009 | 7/1997 |

* cited by examiner

Primary Examiner—Thanh Lam
(74) Attorney, Agent, or Firm—Liniak, Berenato & White

(57) ABSTRACT

A rotating electric machine comprising at least a fan (43) provided with blades providing between them divergent ventilation channels (48) adapted to generate cooling fluid flow through the machine; the angle of incidence (B) of the blades, at the leading edge ranges between 150 degrees and 175 degrees, while the angle of incidence (A) of the blades at the trailing edge ranges between 90 degrees and 165 degrees relative to the tangent to a circle (C) generated during the rotation of the blades, the ratio between the average pitch of the blades (46) and the average length thereof being less than 0.975. The invention is applicable to fans for a motor vehicle alternator.

13 Claims, 2 Drawing Sheets

FAN FOR ROTATING ELECTRIC MACHINE

TECHNICAL FIELD OF THE INVENTION

The present invention relates to a rotating electrical machine, in particular for a motor-vehicle alternator.

More particularly, the invention relates to the ventilation device possessed by such a machine.

STATE OF THE ART

A rotating electrical machine, of the single-phase or multi-phase type, includes at least two parts arranged in coaxial fashion, namely a rotor and a stator, one constituting an armature and the other an inductor.

The rotor generally carries a fan for cooling the machine, at least at one axial end. This is because at least one of the armature/inductor elements includes a coil which heats up such that it is necessary to cool it for correct operation of the machine. This machine most often carries electronic components as well as ball bearings, which it is likewise necessary to cool by the use of a flow of air or, in general, of a cooling fluid, generated by the fan.

When the armature is formed by the rotor, the machine constitutes an electric motor and converts electrical energy into mechanical energy. This machine converts mechanical energy into electrical energy when the armature is formed by the stator so as to operate as an electrical generator and to constitute an alternator, for example. Needless to say, the electrical machine can be reversible in order, for example, to form a motor-vehicle alternator/starter making it possible to start the engine of the vehicle while having an alternator function.

FIG. 1 represents a multi-phase rotating electrical machine in the form of an alternator of the three-phase type for a motor vehicle with an internal-combustion engine.

The alternator includes, going from left to right of FIG. 1, that is to say from front to rear, a drive pulley 10 firmly attached to the front end of a shaft 12, the rear end of which carries collector rings (not referenced) belonging to a collector 14. The axis of the shaft 12 constitutes the rotational axis of the machine.

Centrally, the shaft 12 carries, fixedly, the rotor 16, which is equipped with an excitation coil 18, the ends of which are linked by wire links to the collector 14. For further details, refer to the document EP-A-0 515 259.

The stator of the electrical machine constituting especially an alternator or an alternator/starter can be wound either with wires or with conductor bars, advantageously in the form of rectangular-section pins, which are placed in the notches of the stator. The coils thus formed can be of the three-phase or hexaphase type. The conductors of the said U-shaped pins are preferably aligned in the notches. For more details, refer to French Patent Application No. 01 04770, filed on Apr. 5, 2001, or to French Application No. 01 13553, filed on Oct. 19, 2001.

The rotor 16 here is a claw-type rotor, that is to say a rotor provided externally with axially oriented teeth 120 delimiting between them a passage for cooling-fluid flow, and therefore includes two pole wheels 20, 22, front and rear respectively, each respectively carrying a front fan 24 and a rear fan 26. More precisely, each pole wheel includes a transversely oriented flange carrying at its outer periphery axially oriented teeth 120 of trapezoidal shape overall. The teeth of one of the pole wheels are turned towards the other pole wheel; the teeth of one of the pole wheels being mounted in such a way as to be imbricated with the teeth of the other pole wheel. There is a cylindrical core axially between the two flanges of the pole wheels to enable the excitation coil 18 to be mounted. The core is embodied in a manner distinct from the flanges of the wheels 20, 22. In FIG. 1, each flange has centrally a cylindrical half-core to form the cylindrical core. The wheels 20, 22 are made of a magnetic material and, when the coil 18 is excited, they define North and South poles in a known manner. In this case, 6 to 8 pairs of teeth are defined; each wheel 20, 22 including 6 to 8 poles distributed circumferentially in a regular manner. The rear fan 26 is more powerful than the front fan 24.

These fans 24, 26 include a first series of blades or vanes, which between them form ventilation channels. The blades are obtained by cutting out and folding a sheet-metal flange fixed, for example by welding or by any other appropriate means such as crimping, onto the pole wheel 20, 22 in question. The blades of the rear fan have a greater extent than those of the front fan. Each wheel features, in the manner mentioned above, axial teeth turned towards the other wheel, with the teeth of one wheel imbricated with the other so as to form magnetic poles when the coil 18 is activated by virtue of the collector rings of the collector 14, which are each in contact with a brush (not referenced) carried by a brush holder 28 also serving as a support for a voltage regulator (not represented).

The stator 30, for its part, forms the armature of the alternator and surrounds the rotor 16.

It features a body 32 in the form of a pack of metal plates equipped internally with axial notches (not represented) for the passage of wires or pins which the coils 34 of the stator 30 include. These coils 34 are provided with buns (not referenced) extending, on the one hand, in projection on either side of the body 32 and, on the other hand, radially above the fans 24, 26.

The outputs of the coils 34 are linked to a rectification device 40, in this case to diodes, to rectify the alternating current produced by the stator.

These fans 24, 26 extend in the vicinity respectively of a front bearing 36 and of a rear bearing 38.

The bearings 36, 38 are aluminium-based, for example, and are linked to each other with the aid of tie rods, for example, to form a support casing for the stator and the rotor. The bearings 36, 38 are of hollow form and each include a transverse flange extended at its outer periphery by an axially oriented rim. The body 32 of the stator is carried by the rims of the bearings 36, 38, being interposed between them. The flanges of the bearings 36, 38 each carry at the centre a ball bearing for the rotatable mounting of the shaft 12 for fixing the rotor 16. These bearings 36, 38 are pierced for internal ventilation of the alternator by way of the fans 24, 26 when the latter are driven in rotation by the pulley 10, which is linked to the engine of the motor vehicle by a transmission device including at least one belt in engagement with the pulley. This ventilation makes it possible to cool the coils 18, 34 as well as the brush holder 28 with its regulator, as well as a rectification device 40 which is associated with it. The path followed by the cooling fluid, in this instance air, through the various apertures of the bearings 36, 38 and within the machine, has been represented by arrows. More precisely, the flange of the rear bearing carries the rectification device and the brush holder 28 and the regulator. The bearings 36, 38 each have air inlet vents formed in their flange and air outlet vents formed in their rim facing the buns of the coils 34.

By reason of the nature of the fans 24 and 26, which conventionally consist of fans of centrifugal type, the path of the air in the alternator is essentially radial.

The electrical outputs demanded from the alternator increase greatly with the increase in the number and in the power of the consuming elements fitted on board the motor vehicles. This increase in the electrical output generates a consequent increase in the temperature of the hottest parts of the alternator such as the diodes of the rectification device 40, the rolling bearings, the rotor, etc.

SUBJECT OF THE INVENTION

The ventilation device with which the alternator is provided, although being sufficiently effective to provide the cooling for the various elements of the alternator for relatively moderate electrical outputs, is not very suitable for providing cooling of the alternator for greater outputs.

For high electrical outputs, the size or cross section of the fans has to be increased, giving rise to the appearance of totally unacceptable noise and turbulent flows deleterious to the output of the ventilation device.

It is the object of the invention to remedy these disadvantages.

It therefore relates to a rotating electrical machine comprising a rotor provided with pole wheels, each equipped with teeth, at least one fan firmly attached to the rotor and provided with a number of blades higher than that of the teeth of each pole wheel; the blades forming between them diverging ventilation channels and being suitable for producing a flow of cooling fluid through the machine, essentially characterised in that the angle of incidence of the blades at the level of the leading edge is between 150° and 175°, in that the angle of incidence of the blades at the level of the trailing edge is between 90° and 165° relative to the tangent to a circle generated during the rotation of the blades, and in that the ratio of the mean pitch of the blades to the mean length of the latter is less than 0.975.

According to one characteristic, when the machine includes two fans firmly attached to the rotor, the number of blades of the front fan is higher than the number of blades of the rear fan. In this way, the noise emitted by the front fan is reduced. Indeed, increasing the number of blades of a fan makes it possible, for the same power, to reduce the diameter of the fan, the effect of this being to reduce the noise. Increasing the number of blades also makes it possible to increase the number of harmonics in such a way as to enrich the spectrum of the harmonics in order to obtain white noise as far as possible.

Good results have been obtained by providing the front fan with 11 blades and the rear fan with 9 blades; the blades of the rear fan having a greater extent than those of the front fan.

According to an advantageous embodiment, the front fan has a diameter smaller than that of the rear fan.

In various embodiments, this ventilation device can likewise include one or more of the following characteristics, taken in isolation or in any of the technically possible combinations:

the ventilation channels have an inlet cross section of generally square shape;

the blades include a first set of blades forming between them the said ventilation channels, and a second set of blades, called second blades, which are shorter than the first set of blades and are installed radially above the inner periphery of the first set of blades in at least one channel in such a way that at least one blade of the second set of blades is interposed between two consecutive blades of the first set of blades;

the height of at least some of the blades of the first and second sets of blades decreases from the inner periphery towards the outer periphery;

at least one channel is not provided with a second blade;

at least one of the blades of the first and second sets of blades is distributed in an irregular manner relative to the other blades;

at least one of the blades of the first and second sets of blades is provided with a surface, over-hanging the bottom of the channels, suitable for avoiding a secondary flow of the cooling fluid above the said blade;

the said surface is constituted by a fin extending perpendicularly or in a sloping manner from the blade;

the said surface is formed by a cover, which covers the blades.

BRIEF DESCRIPTION OF THE DRAWINGS

Other objects, characteristics and advantages will emerge from the following description, given purely by way of non-restrictive example and with reference to the attached drawings, in which.

DESCRIPTIONS OF PREFERRED EMBODIMENTS OF THE INVENTION

Figure 1:
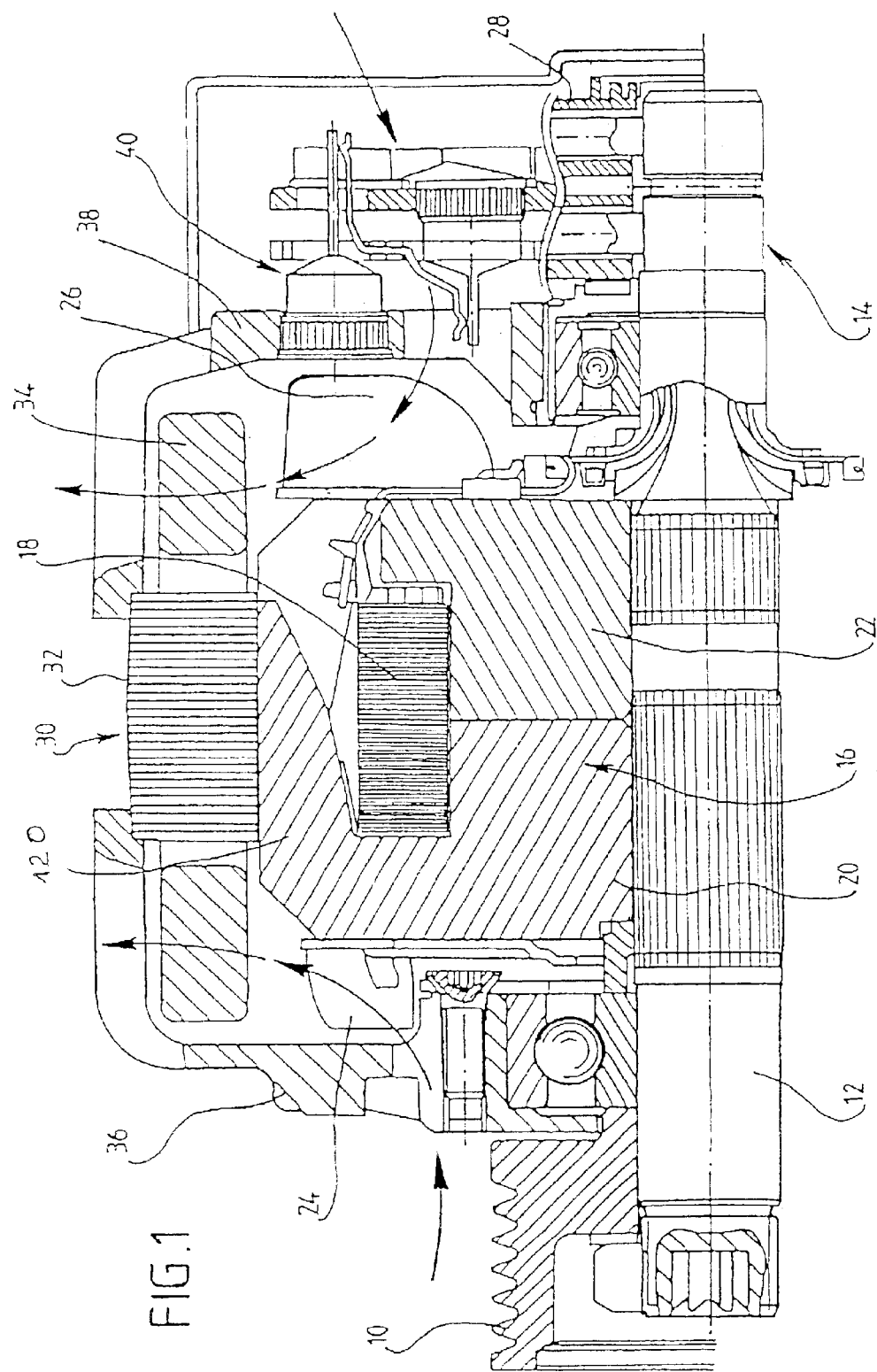
FIG. 1 illustrates an axial half-section of a motor-vehicle alternator provided with a ventilation device in accordance with the prior art.

It will be noted that, in these various embodiments, the casing of the motor-vehicle alternator, in which the rotor and the stator are arranged, is provided in the manner mentioned above with a front bearing and a rear bearing, each provided with air inlet and outlet vents arranged respectively at the front and the rear so as to allow efficient air intake and outflow during operation of the alternator. More precisely, use is made of an alternator of the type in FIG. 1, including a rotor with two pole wheels, on which a front fan and a rear fan respectively are fixed in the above-mentioned manner. The fans according to the invention are mounted in place and instead of the fans 26 and 24 in FIG. 1.

In the invention, the rear fan is provided with a number of blades smaller than that of the front fan. The blades of the rear fan have a greater extent than those of the front fan, such that the rear fan is more powerful. The number of blades of each fan is greater than the number of teeth of the pole wheels.

To ensure efficient operation of the fans, it is necessary to use fans whose blades are suitable for obtaining a relatively high output and stable or not very turbulent flow and which make it possible to avoid any separation of the streams of fluid with respect to the blades. To do this, use is made of blades whose angle of incidence at the level of the leading edge, that is to say the angle delimited by the blades and the tangent to the circle generated by the latter in the course of their rotation, is between 150° and 175°, the angle of incidence of the blades at the level of the trailing edge being between 90° and 165° relative to the tangent to the circle generated by the rotation of the trailing edge in operation.

According to an important characteristic of the invention, the blades are moreover chosen in such a way that the inter-vane channels, that it is to say the channels delimited by the blades, have a ratio of the mean pitch to the length of each blade which is relatively small, preferably less than 0.975, with a substantially square inlet cross section. Moreover, any discontinuity in the guide surface within the inter-vane channels will be avoided in the blades such that the fluid is guided without loss and remains stable and does not suffer any separation with respect to the blades.

Figure 2:
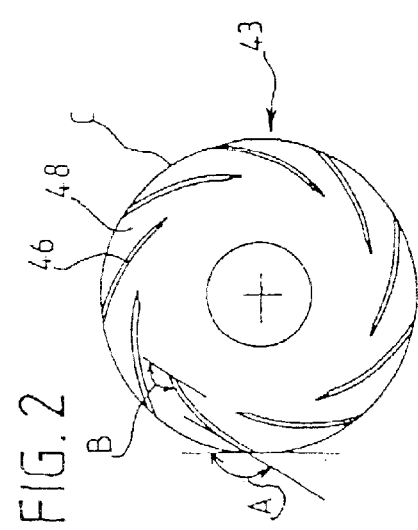
FIG. 2 is a view from above of an embodiment example of a fan of the device according to the invention.

FIG. 2 shows a first embodiment example of a fan, which allows these characteristics to be obtained.

As can be seen in this figure, the fan, in this case the rear fan, designated by the general reference numeral 43, includes blades, such as 46, likewise referred to as vanes, forming between them ventilation or inter-vane channels 48, which diverge towards the outside and within which the cooling fluid flows when the rotor of the machine and hence the fan firmly attached to the rotor by any appropriate means rotates.

The channels 48 widen as they progress from the inner periphery to the outer periphery of the blades 46.

As indicated above, with a view to obtaining a fluid that has the minimum disturbance at the inlet and the outlet, the angles of incidence at the inlet, designated B, are between 150° and 175°, the angles of incidence at the outlet, designated by the reference A, being between 90° and 165°. These angles are delimited by the surface of the blades and the tangent to the circle C formed during the rotation of the blades or a line parallel to the latter. Here, the rear fan includes 9 blades and the front fan includes 11 blades. The situation is the same in the embodiment in FIG. 3. In the other figures, the number of blades is higher. Nevertheless, a reduction in the noise of the machine relative to the other embodiments has been observed with a combination of 11 blades for the front fan and 9 blades for the rear fan.

Figure 3:
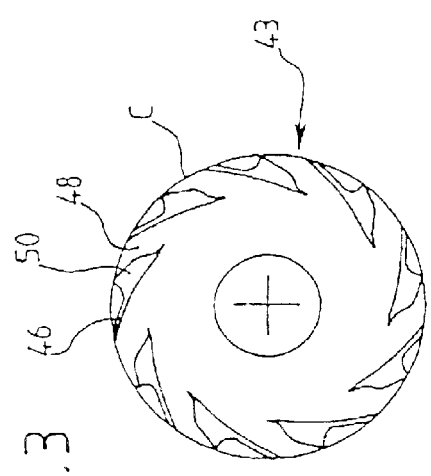
FIG. 3 is a variant embodiment of a fan of the ventilation device according to the invention.

With reference to FIG. 3, with the aim of avoiding the appearance of secondary flows at the level of the trailing edge, at least some of the blades are provided with a fin, such as 50, overhanging the bottom of the channels 48 and extending perpendicularly or in a sloping manner relative to the blades, avoiding secondary flow of the fluid above these blades.

It may likewise be desirable to regulate even more the speed of the cooling fluid to ensure that it is as constant as possible while exhibiting a minimum of disturbance.

Thus, possibly in combination with the use of fins, the height of at least some of these blades decreases from their inner periphery towards their outer periphery.

Figure 4:
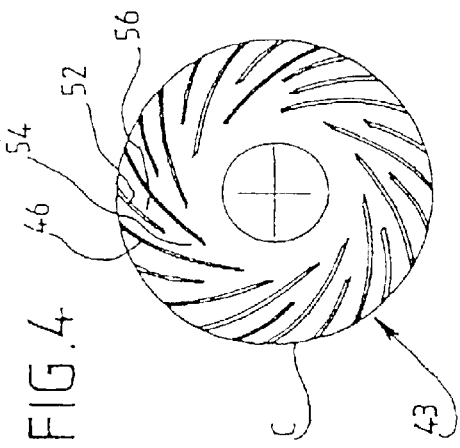
FIG. 4 illustrates a third embodiment example of a fan of a ventilation device in accordance with the invention.

According to another version, which is shown in FIG. 4, possibly in combination with the use of fins and with the decreasing height of the blades, with the aim of reducing the noise of the electrical machine while at the same time improving ventilation of the latter, a secondary blade, such as 52, which is, on the one hand, shorter than the main blades 46 and, on the other hand, is installed radially above the inner periphery of the main blades 46, is interposed between two consecutive blades 46, although some of the ventilation channels 48 can be without such a secondary blade 52.

The ventilation channels 48 are thus subdivided into two parts 54 and 56, namely a radially inner part 54 extending radially below the inner periphery of the secondary blade 52 and a radially outer part 56, in which the secondary blade is accommodated so as to compress the cooling fluid so that it is in contact with the main blades 46. It will be noted that the secondary blades can likewise be provided with an end fin 50 extending perpendicularly or in a sloping manner from the corresponding blade.

Finally, as will be seen in FIG. 4, the blades can be distributed at regular or irregular angles relative to the other blades. However, if the blades are arranged in an irregular manner the noise of operation of the fans is reduced even more.

Finally, it will be noted that an invention is not limited to the embodiments described.

Figure 5:
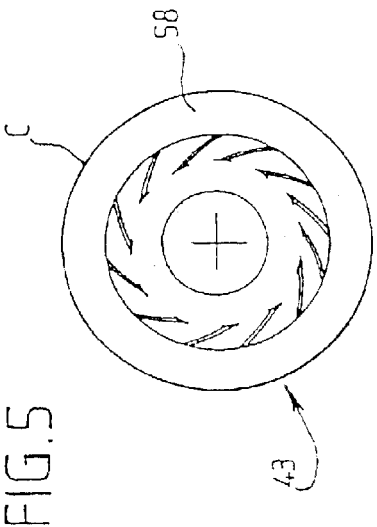
FIG. 5 is a perspective view illustrating a fourth embodiment example of a fan of a ventilation device in accordance with the invention.

Indeed, while, in the embodiment described with reference to FIG. 3, the blades can be provided with fins that prevent the appearance of a secondary flow above the blades, it is possible, as a variant, to replace these fins with a cover that covers all or part of the blades in such a way as to avoid the appearance of a secondary flow in this zone. FIG. 5 shows such a cover at 58. This cover is embodied in the form of an annular disc, which is fixed on the free edges of the blades, advantageously by adhesive bonding or in any other appropriate known manner. However, the fan with the cover could be obtained in one piece.

Figure 6:
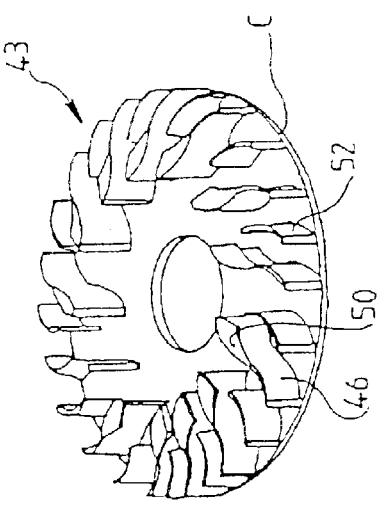
FIG. 6 is a perspective view of a fifth embodiment example of a fan of a ventilation device according to the invention.

FIG. 6 shows an embodiment of the fan in which secondary blades, such as blades 52 in FIG. 4, are arranged between two blades 46 provided with fins 50 in FIG. 3.

Here, the number of teeth of each pole wheel is between 6 and 8, such that the machine includes 6 to 8 pairs of poles. In all cases, the rear fan thus includes a number of blades higher than the number of teeth of one of the pole wheels.

Very good results and performance have been obtained with a rotor that has 7 pairs of poles and a stator body with an outside diameter of between 132 mm and 138 mm, the coils being of the type described in the document FR 01 13353 mentioned above, to which reference will be made for more details. Thus, the coils include U-shaped conductor elements of rectangular cross section with a total of 4 conductors juxtaposed in each notch possessed in a known manner by the body of the stator.

In certain applications, it is, of course, possible to omit the front fan.

What is claimed is:

1. Rotating electrical machine comprising a rotor (16) provided with pole wheels (20, 22), each equipped with teeth (120), at least one fan (43) firmly attached to the rotor (16) and provided with a number of blades (46) higher than that of the teeth (120) of each pole wheel (20, 22), the blades (46) forming between them ventilation channels (48) which diverge and are suitable for producing a flow of cooling fluid through the machine, characterised in that the angle of incidence (B) of the blades at the level of the leading edge is between 150° and 175°, in that the angle of incidence (A) of the blades at the level of the trailing edge is between 90° and 165° relative to the tangent to a circle generated during the rotation of the blades, and in that the ratio of the mean pitch of the blades (46) to the mean length of the latter is less than 0.975.

2. Machine according to claim 1, characterised in that it includes two fans (24, 26), a front fan (24) and a rear fan (26) respectively, the blades (46) of which have a greater extent than those of the front fan (26), and in that the number of blades of the front fan (24) is higher than the number of blades of the rear fan (26).

3. Machine according to claim 2, characterised in that the front fan includes eleven blades and the rear fan includes nine blades.

4. Machine according to claim 2, characterised in that the front fan has a diameter smaller than that of the rear fan.

5. Machine according to claim 1, characterised in that the ventilation channels (48) have an inlet cross section of generally square shape.

6. Machine according to claim 1, characterised in that the blades include a first set of blades (46) forming between them the said ventilation channels, and a second set of blades (52), called second blades, which are shorter than the first set of blades and are installed radially above the inner periphery of the first set of blades in at least one channel in such a way that at least one blade of the second set of blades is interposed between two consecutive blades of the first set of blades.

7. Machine according to claim 6, characterised in that the height of at least some of the blades of the first and second sets of blades (46, 52) decreases from the inner periphery towards the outer periphery.

8. Machine according to claim 6, characterised in that at least one channel is not provided with a second blade.

9. Machine according to claim 6, characterised in that at least one of the blades of the first and second sets of blades (46, 52) is distributed in an irregular manner relative to the other blades.

10. Machine according to claim 6, characterised in that at least one of the blades of the first and second sets of blades (46, 52) is provided with a surface (50), overhanging the bottom of the channels, suitable for avoiding a secondary flow of the cooling fluid above the said blade.

11. Machine according to claim 10, characterised in that the said surface is constituted by a fin (50) extending perpendicularly or in a sloping manner from the blade.

12. Machine according to claim 10, characterised in that the said surface is formed by a cover (58), which covers the blades.

13. Machine according to claim 1, characterised in that it consists in an alternator for a motor vehicle.

* * * * *